(12) United States Patent
Nakayama et al.

(10) Patent No.: US 8,003,068 B2
(45) Date of Patent: Aug. 23, 2011

(54) HYDROGEN CHLORIDE SUPPLY SYSTEM, AIR POLLUTION CONTROL SYSTEM, AND HYDROGEN CHLORIDE SUPPLY CONTROL SYSTEM

(75) Inventors: Yoshio Nakayama, Hiroshima (JP); Susumu Okino, Hiroshima (JP); Nobuyuki Ukai, Hiroshima (JP); Moritoshi Murakami, Hiroshima (JP); Shintaro Honjo, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 390 days.

(21) Appl. No.: 12/349,804

(22) Filed: Jan. 7, 2009

(65) Prior Publication Data

US 2009/0182650 A1    Jul. 16, 2009

(30) Foreign Application Priority Data

Jan. 11, 2008    (JP) ................................ 2008-004938

(51) Int. Cl.
B01D 53/64 (2006.01)
B01D 53/74 (2006.01)
(52) U.S. Cl. ................. 423/210; 423/239.1; 423/242.1; 423/240 R
(58) Field of Classification Search .................. None
See application file for complete search history.

(56) References Cited

U.S. PATENT DOCUMENTS

| | | | | |
|---|---|---|---|---|
| 2,475,752 A * | 7/1949 | Nachod et al. | ................ | 423/482 |
| 3,498,761 A * | 3/1970 | Sandford et al. | ............. | 423/379 |
| 4,996,836 A * | 3/1991 | Reh et al. | ........................ | 60/781 |
| 5,321,946 A * | 6/1994 | Abdelmalek | ................... | 60/648 |
| 6,638,485 B1 | 10/2003 | Iida et al. | | |
| 6,913,737 B2 | 7/2005 | Honjo et al. | | |
| 2007/0202020 A1 | 8/2007 | Honjo et al. | | |
| 2007/0274900 A1* | 11/2007 | Bulan et al. | ................... | 423/502 |
| 2008/0138264 A1 | 6/2008 | Honjo et al. | | |
| 2009/0145770 A1* | 6/2009 | Sims | ............................ | 205/556 |

FOREIGN PATENT DOCUMENTS

JP    10-230137 A    9/1998

(Continued)

OTHER PUBLICATIONS

International Search Report of PCT/JP2008/071051, date of mailing date Mar. 10, 2009.

*Primary Examiner* — F. Ryan Zeender
*Assistant Examiner* — Ariel Yu
(74) *Attorney, Agent, or Firm* — Westerman, Hattori, Daniels & Adrian, LLP

(57) ABSTRACT

An air pollution control system comprises: a carry-in tank truck that carries in a feedstock, i.e., concentrated hydrochloric acid (35% hydrochloric acid); a hydrogen chloride vaporizer that vaporizes the concentrated hydrochloric acid to obtain hydrogen chloride; a liquid level regulator that separates residual hydrogen chloride from extracted dilute hydrochloric acid discharged as a by-product from the hydrogen chloride vaporizer, and that regulates the liquid level of the hydrogen chloride vaporizer; a concentration regulating tank that regulates the hydrochloric acid concentration of extracted dilute hydrochloric acid 25B from which the residual hydrogen chloride has been separated to a predetermined concentration (e.g., 22%); a by-product tank that stores therein dilute hydrochloric acid regulated to have a predetermined concentration; and a carry-out tank truck that carries out the dilute hydrochloric acid with a predetermined concentration discharged from the by-product tank.

1 Claim, 4 Drawing Sheets

FOREIGN PATENT DOCUMENTS

| | | |
|---|---|---|
| JP | 2001-198434 A | 7/2001 |
| JP | 2002-251414 A | 9/2002 |
| JP | 2002-259536 A | 9/2002 |
| JP | 3507445 B2 | 3/2004 |
| JP | 2004-313833 A | 11/2004 |
| JP | 2007-167743 A | 7/2007 |
| JP | 2008-142602 A | 6/2008 |

* cited by examiner

HYDROGEN CHLORIDE SUPPLY SYSTEM, AIR POLLUTION CONTROL SYSTEM, AND HYDROGEN CHLORIDE SUPPLY CONTROL SYSTEM

BACKGROUND OF THE INVENTION

1. Field of the Invention

The present invention relates to a hydrogen chloride supply system, an air pollution control system, and a hydrogen chloride supply control system.

2. Description of the Related Art

Conventionally, various systems for removing mercury in flue gas have been considered because, boilers serving as combustion apparatuses in power stations and other facilities discharge flue gas containing highly toxic mercury.

A boiler generally includes a wet desulfurization apparatus for removing sulfur content in flue gas. In flue gas treatment facilities including such a boiler provided with a desulfurization apparatus that serves an exhaust gas treatment apparatus, as chlorine (Cl) content increases in flue gas, the ratio of water-soluble divalent metallic mercury increases. This facilitates collection of the mercury with the desulfurization apparatus, as is well known.

In recent years, various proposals have been made on denitration apparatuses that reduce NOx, and on methods and apparatuses for treating the metallic mercury in combination with a wet desulfurization apparatus that uses an alkali absorbing solution as SOx absorbent.

As treatment of metallic mercury in flue gas, removal methods using an absorbent such as activated carbon or a selenium filter have been known. These methods, however, require special means for absorption removal, and are not suitable for treatment of a large volume of flue gas, such as flue gas in power stations.

As a method for treating metallic mercury in a large volume of flue gas, methods have been proposed that include: gas-atomizing a chlorinating agent in a flue at an upstream process in a high-temperature denitration apparatus, oxidizing (chlorinating) the mercury on a denitration catalyst to be aqueous hydrogen chloride, and then absorbing it in a downstream wet desulfurization apparatus (for example, see Japanese Patent Application Laid-open No. 10-230137). Apparatuses and techniques for spraying gas in a flue have been commercialized as $NH_3$ spray devices of denitration apparatuses, and the same means can be used for gas atomization of a chlorinating agent.

When employing the mercury removal system that sprays hydrogen chloride or the like as proposed above, 35% hydrochloric acid is evaporated in a vaporizer. Accordingly, the resulting by-product, i.e., dilute hydrochloric acid, is discharged by an amount equivalent to about 80% of the feedstock (35% hydrochloric acid). This poses a problem that the dilute hydrochloric acid results in a waste product for the power station.

The chlorine concentration varies depending on the type of coal used in the power station (i.e., coal type). Even when a coal type with high chloride concentration is used, 29 tons of 35% concentrated hydrochloric acid is necessary per day, and dilute hydrochloric acid is discharged by an amount equivalent to that of the 35% concentrated hydrochloric acid. Thus, to establish recycling plants as ancillary facilities to treat the dilute hydrochloric acid as a waste product, a set of plants needs to be established. This increases costs for establishing and maintaining the plants.

It is also considered to establish recycling plants within power generating facilities. This requires, however, substantial addition in treatment processes because non volatile materials are circulated and concentrated in the treatment of the dilute hydrochloric acid.

Thus, there is a demand to make dilute hydrochloric acid, discharged as a by-product, available for reutilization and recycle it, without disposing it.

The present invention is made in view of the above problems, and has an object to provide a hydrogen chloride supply system, an air pollution control system, and a hydrogen chloride supply control system that require low operating costs.

SUMMARY OF THE INVENTION

An object of the present invention is to at least partially solve the problems in the conventional technology.

According to an aspect of the present invention, a hydrogen chloride supply system comprises: carry-in means that carries in concentrated hydrochloric acid as a feedstock; a hydrogen chloride vaporizer that vaporizes the concentrated hydrochloric acid to obtain hydrogen chloride; a liquid level regulator that separates residual hydrogen chloride from extracted dilute hydrochloric acid discharged from the hydrogen chloride vaporizer, and that regulates a liquid level of the hydrogen chloride vaporizer; a concentration regulating tank that regulates a hydrochloric acid concentration of extracted dilute hydrochloric acid; a by-product tank that stores therein dilute hydrochloric acid regulated to have a predetermined concentration; and carry-out means that carries out the dilute hydrochloric acid with a predetermined concentration discharged from the by-product tank.

According to another aspect of the present invention, an air pollution control system comprises: a spray device that sprays hydrogen chloride into flue gas discharged from a coal combustion boiler; a denitration apparatus that reduces nitrogen oxide in flue gas into which the hydrogen chloride has been sprayed, and that oxidizes mercury; an air heater that recovers heat in gas from which the nitrogen oxide has been reduced; a dust extractor that reduces dust in gas from which the heat has been recovered; a desulfurization apparatus that reduces sulfur oxide in gas from which the dust has been reduced; a stack from which gas thus desulfurized is discharged outside; carry-in means that carries in concentrated hydrochloric acid as a feedstock; a hydrogen chloride vaporizer that vaporizes the concentrated hydrochloric acid to obtain hydrogen chloride; a liquid level regulator that separates residual hydrogen chloride from extracted dilute hydrochloric acid discharged from the hydrogen chloride vaporizer, and that regulates a liquid level of the hydrogen chloride vaporizer; a gas-liquid separator that separates the residual hydrogen chloride from extracted dilute hydrochloric acid; a concentration regulating tank that regulates a hydrochloric acid concentration of extracted dilute hydrochloric acid from which the residual hydrogen chloride has been reduced; a by-product tank that stores therein dilute hydrochloric acid regulated to have a predetermined concentration; and carry-out means that carries out the dilute hydrochloric acid with a predetermined concentration discharged from the by-product tank.

According to still another aspect of the present invention, a hydrogen chloride supply control system comprises: a hydrogen chloride supply system that feeds hydrogen chloride to an air pollution control system; an arithmetic device that obtains information on amounts of a feedstock to be supplied to and used in the devices, a production amount of a by-product, a production amount of hydrogen chloride, and a mercury amount, and that processes the information; and a network that connects a hydrogen chloride production section, a feedstock feed section that feeds a feedstock or the like to the hydrogen chloride feed section, an inventory management section that manages an inventory, and an arithmetic processing device, via communication. The feedstock feed section includes: the inventory management section that determines an amount of hydrochloric acid to be used according to a fuel type, orders a feedstock, and manages an inventory; and a distribution section that determined a purchase amount of a feedstock, predicts a production amount of a by-product, and sells the by-product thus produced, the hydrogen chloride production section includes a production management terminal that notifies an amount of produced hydrogen chloride to the air pollution control system, the inventory management section includes an inventory management terminal that notifies data on an inventory amount of a stored feedstock to a feed system, and the distribution section includes a management terminal that monitors a use amount of a feedstock, and a management terminal that monitors a production amount of dilute hydrochloric acid being a produced by-product.

The hydrogen chloride supply control system may predetermine by auction a destination to which the dilute hydrochloric acid is transported.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Exemplary embodiments of the present invention will be described in detail with reference to the accompanying drawings. The present invention is not limited by the embodiments. Constituting elements in the embodiments include elements that can be easily achieved by a person skilled in the art, or elements being substantially the same as those elements.

First Embodiment

Figure 1:
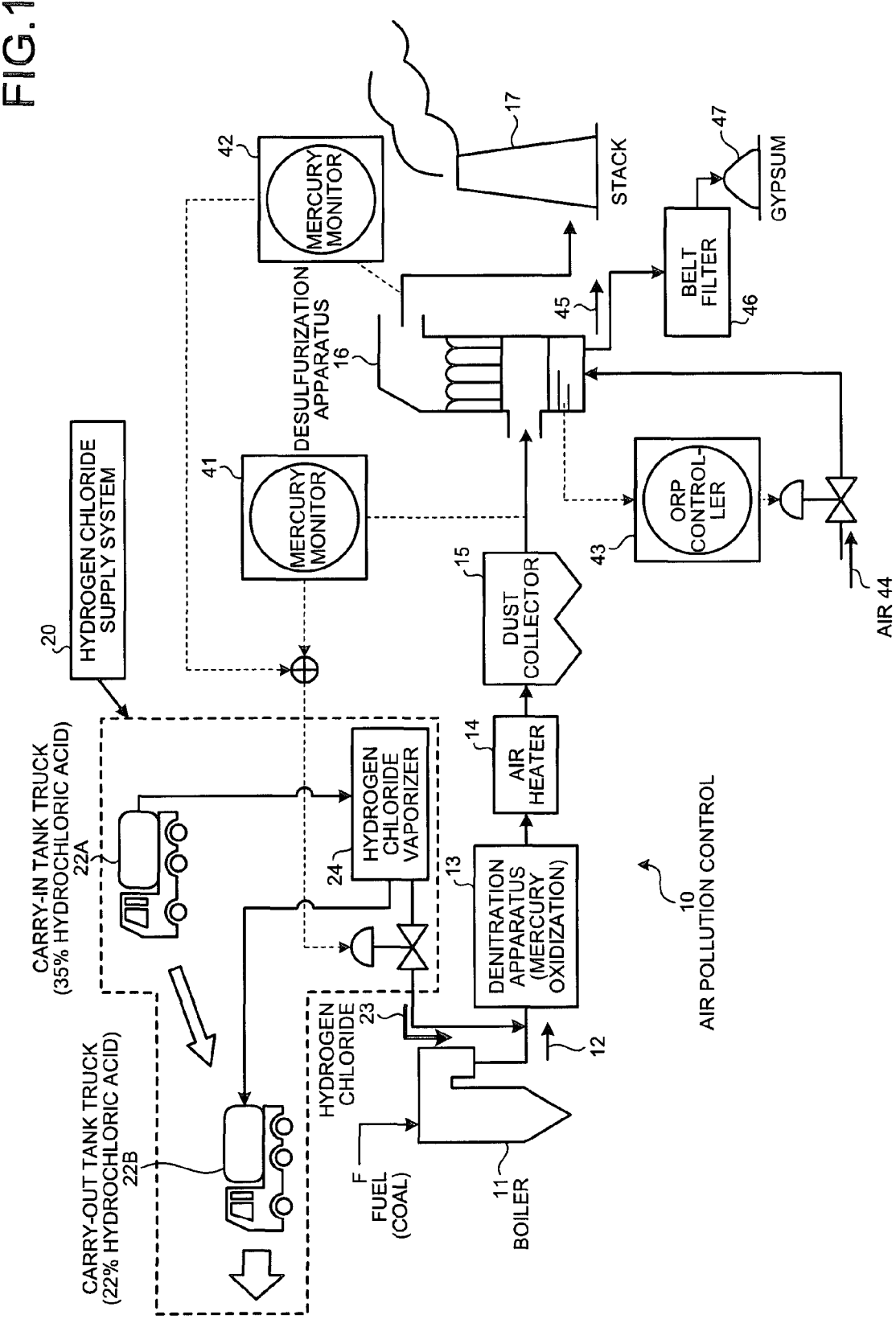
FIG. 1 is a schematic diagram of an air pollution control system according to a first embodiment.
Figure 2:
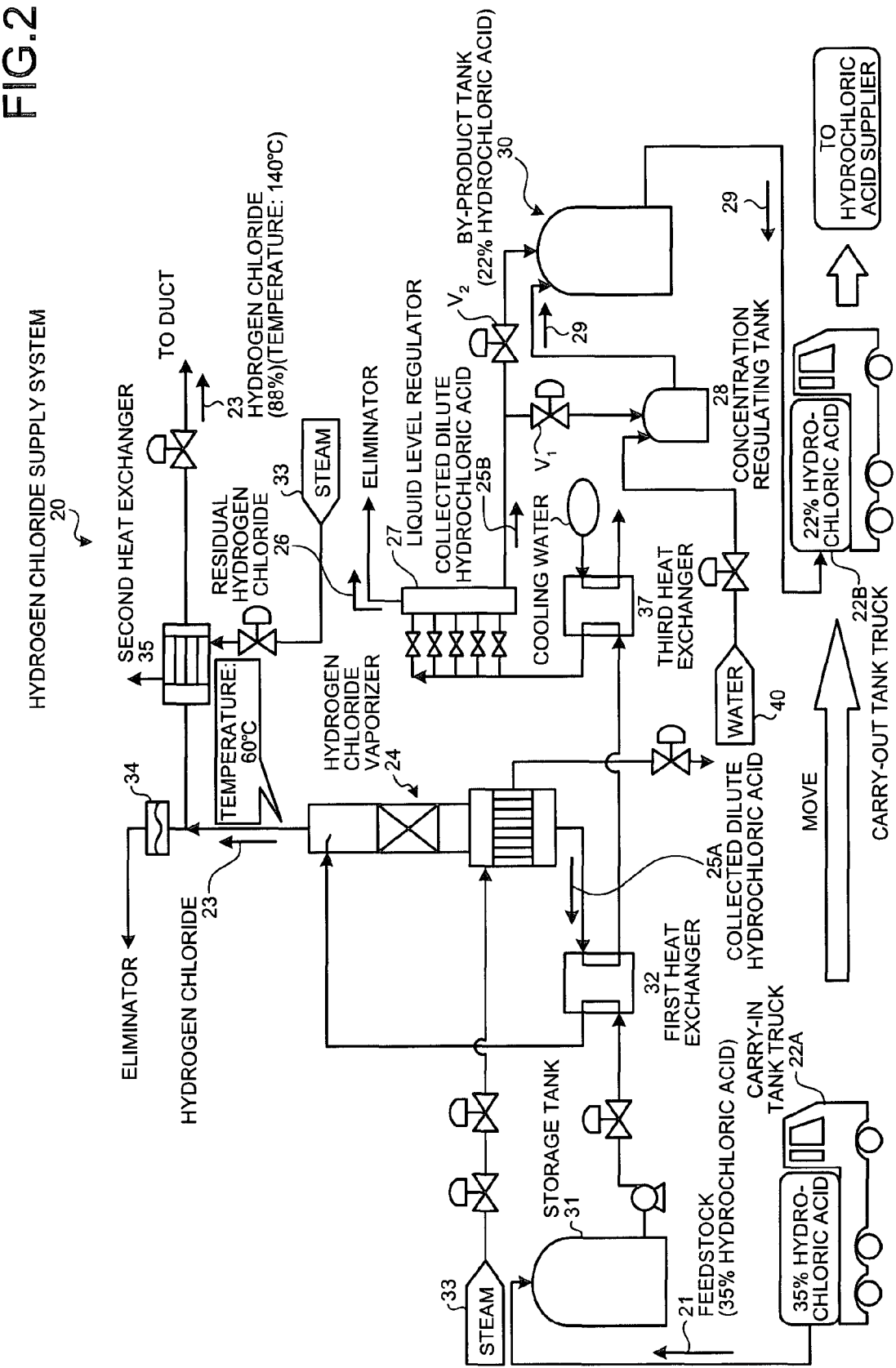
FIG. 2 is a schematic diagram of a hydrogen chloride supply system being a relevant portion shown in FIG. 1.

FIG. 1 is a schematic diagram of an air pollution control system according to a first embodiment. FIG. 2 is a schematic diagram of a hydrogen chloride supply system that is a relevant portion shown in FIG. 1. As shown in FIG. 1, an air pollution control system 10 according to the present embodiment includes: a denitration apparatus 13 that reduces nitrogen oxide in flue gas 12 discharged from a coal combustion boiler 11, and that sprays hydrogen chloride 23 into the gas to oxidize and reduce mercury; an air heater 14 that recovers heat in gas from which the nitrogen oxide has been reduced; a dust extractor 15 that reduces dust in gas from which the heat has been recovered; a desulfurization apparatus 16 that reduces sulfur oxide in gas from which the dust has been reduced; a stack 17 from which desulfurized gas is discharged to the outside; and a hydrogen chloride supply system 20 that produces the hydrogen chloride 23. In FIG. 1, indicated by reference numerals 41 and 42 are mercury monitors, 43 is a redox potential measurement controller (oxidation-reduction potential (ORP)), and 45 is dilute sulfuric acid containing mercury discharged from the desulfurization apparatus, 46 is a belt filter, and 47 is gypsum.

As shown in FIG. 2, the hydrogen chloride supply system 20 includes: a carry-in tank truck 22A that carries in a feedstock, i.e., concentrated hydrochloric acid (35% hydrochloric acid) 21; a hydrogen chloride vaporizer 24 that vaporizes the concentrated hydrochloric acid (35% hydrochloric acid) to obtain the hydrogen chloride 23; a liquid level regulator 27 that separates residual hydrogen chloride from extracted dilute hydrochloric acid 25A discharged from the hydrogen chloride vaporizer 24, and that regulates the liquid level of the hydrogen chloride vaporizer 24; a concentration regulating tank 28 that regulates the hydrochloric acid concentration of extracted dilute hydrochloric acid 25B from which residual hydrogen chloride 26 has been separated to a predetermined concentration (e.g., 22%); a by-product tank 30 that stores therein dilute hydrochloric acid 29 regulated to have a predetermined concentration; and a carry-out tank truck 22B that carries out the dilute hydrochloric acid 29 with a predetermined concentration discharged from the by-product tank 30. In FIG. 2, a reference numeral 31 indicates a concentrated hydrochloric acid tank.

According to the present invention, for example, in a power station including an air pollution control facility, dilute hydrochloric acid, discharged as a by-product resulting from treatment of its flue gas, is not disposed but discharged as reusable dilute hydrochloric acid having a predetermined concentration. In this way, the dilute hydrochloric acid can be reutilized.

Further, an agent for transporting a feedstock, i.e., concentrated hydrochloric acid, does not leave with an empty tank after supplying the feedstock by transport means (e.g., a tank such as a trailer or a tank truck) for supplying about 35% hydrochloric acid as the feedstock. The agent loads the discharged dilute hydrochloric acid with a predetermined concentration and brings it back. In this way, a distribution cycle is established.

The present embodiment describes a tank truck as means for carrying in and out hydrogen chloride. The present invention is not limited to this, and any known means for transporting hydrochloric acid may be used, such as a tank truck, a trailer, or a freight car.

The dilute hydrochloric acid is made to have a predetermined concentration, and therefore can be recycled as a sale product to be reutilized.

In the hydrogen chloride supply system 20, the hydrogen chloride vaporizer 24 produces the hydrogen chloride 23 at about 60° C. By increasing the temperature at a second heat exchanger using steam 33, the hydrogen chloride 23 having a hydrogen chloride concentration of 88% (temperature: 140° C.), which is suitable for air pollution control, is sprayed into a duct. In this way, the mercury is reduced.

On the other hand, hydrochloric acid remained after hydrogen chloride is vaporized in the hydrogen chloride vaporizer 24 is heat exchanged as the extracted dilute hydrochloric acid 25A at a first heat exchanger 32. The extracted dilute hydrochloric acid 25A is then cooled at a third heat exchanger 37, and subjected to gas-liquid separation at the liquid level regulator 27. In this way, the residual hydrogen chloride 26 is reduced, and the extracted dilute hydrochloric acid 25B is obtained.

The extracted dilute hydrochloric acid 25B is introduced to the concentration regulating tank 28 when its concentration is equal to or more than a predetermined concentration. The extracted dilute hydrochloric acid 25B is then diluted with water 40 to have a predetermined concentration (e.g., 22%), and introduced as the dilute hydrochloric acid 29 with a regulated concentration to the by-product tank 30, loaded on the carry-out tank truck 22B, and transported to a hydrochloric acid supplier etc.

Figure 3:
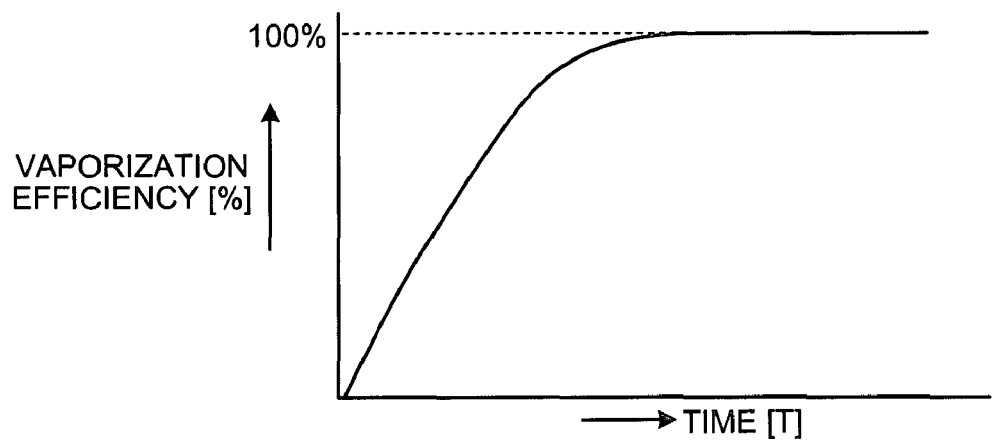
FIG. 3 is a graph depicting a relationship between time and vaporization efficiency for vaporizing hydrochloric acid.
Figure 4:
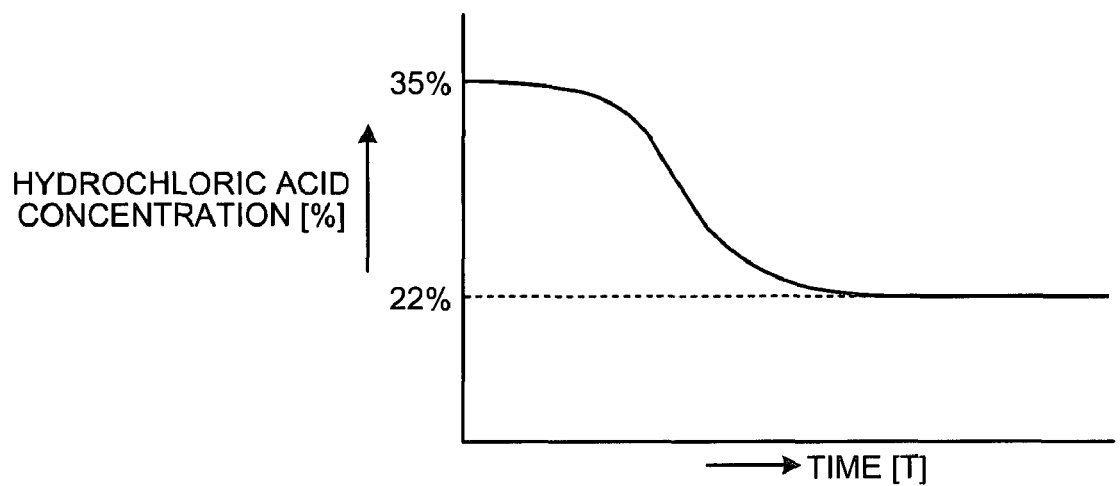
FIG. 4 is a graph depicting a relationship between a hydrochloric concentration and time, corresponding to the vaporization efficiency.

The concentration is regulated because the relationship between the vaporization efficiency (%) and time (T) at the hydrogen chloride vaporizer 24 is such that when the vaporization efficiency is low, the hydrochloric acid concentration of the extracted dilute hydrochloric acid 25A is maintained high, as shown in FIGS. 3 and 4. This phenomenon also occurs when the vaporization is stopped. Until the vaporization efficiency reaches a predetermined stable state, the extracted dilute hydrochloric acid is diluted with the water 40 by opening a valve $V_1$ so as to be introduced to the concentration regulating tank 28. After the vaporization efficiency becomes steady, the concentration of the extracted hydrochloric acid is about 22%. Thus, by closing the valve $V_1$ and opening a valve $V_2$, the dilute hydrochloric acid is directly introduced to the by-product tank 30.

As such, until the vaporization efficiency of the hydrogen chloride 23 becomes stable at the hydrogen chloride vaporizer 24, the concentration of the extracted dilute hydrochloric acid 25A is high. Thus, by regulating the concentration and then introducing the dilute hydrochloric acid to the by-product tank 30, the dilute hydrochloric acid is made to have a predetermined concentration.

The hydrochloric acid concentration may be measured by using known concentration measurement methods. Examples of known concentration measurement methods include a method specified in Japanese industrial standards (JIS) K 1310, neutralization titration in JIS K1310-1-1, potentiometric titration in JIS K1310-1-1, a density measurement method in JIS1310-2, a concentration estimation method using a pH meter, and a concentration estimation method with ion electrodes, which can be used as appropriate. The amount of contained chlorine varies depending on the type of coal used as a fuel for combustion in the boiler. Accordingly, the amount of hydrogen chloride to be supplied varies depending on the coal type. Because the consumption of hydrochloric acid varies depending on the coal type, the fuel needs to be ordered in advance based on prediction.

The dilute hydrochloric acid, which is an extracted by-product, may be reutilized as highly concentrated hydrochloric acid by spraying hydrogen chloride again. Alternatively, the dilute hydrochloric acid may be used as cleaner hydrochloric acid, hydrochloric acid for treating wastewater, or the like.

According to the present invention, hydrochloric acid produced as a by-product can be made to have a predetermined concentration and sent to a hydrochloric acid supplier. Further, dilute hydrochloric acid can be immediately taken away from the power generating facility by loading it in the empty tank truck that has carried in the highly concentrated hydrochloric acid. In this way, unnecessary stock of hydrochloric acid is reduced from the power generating facility.

For example, a small power plant uses 35 tons of concentrated hydrochloric acid per day. In this case, although about 29 tons of dilute hydrochloric acid is produced per day, the dilute hydrochloric acid can be carried out immediately. Thus, a mercury removal system is realized that requires low operating costs for treating flue gas. Depending on the coal type, the variation occurs ranging from 30 tons per day (when a hydrochloric acid concentration is about 300 ppm) to 120 tons per day (a hydrochloric acid concentration is about 100 ppm), i.e., about a fourfold variation.

Second Embodiment

Figure 5:
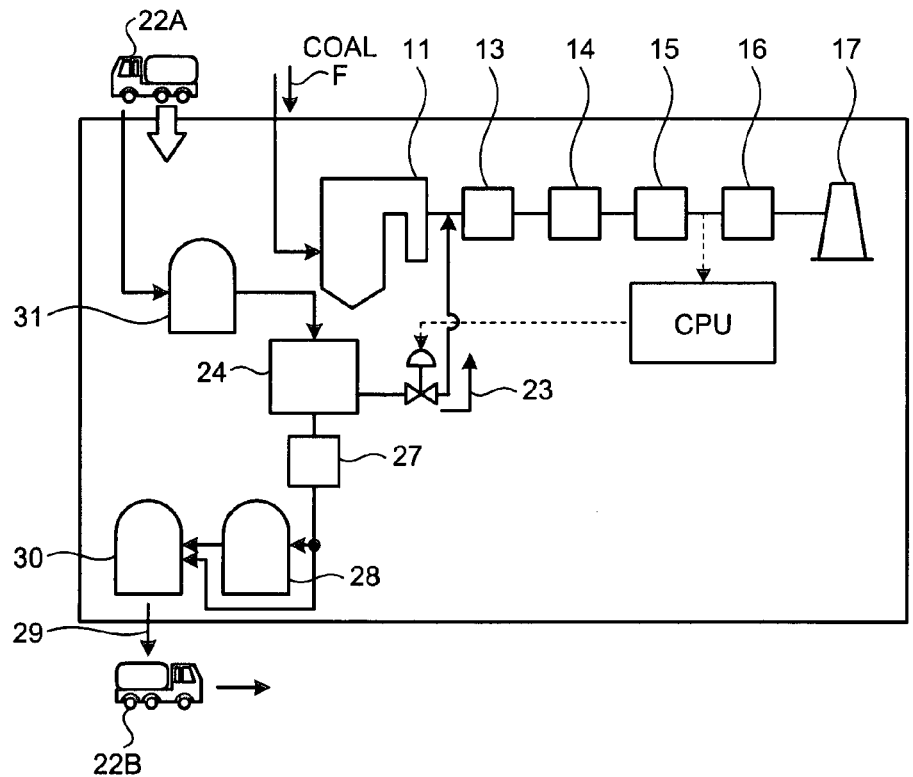
FIG. 5 is a schematic of an air pollution control system according to a second embodiment.

The following describes an air pollution control system according to a second embodiment of the present invention. FIG. 5 is a schematic of an air pollution control system according to the second embodiment. As shown in FIG. 5, the air pollution control system 10 according to the present embodiment includes: the coal combustion boiler 11 that uses coal as a fuel F; the denitration apparatus 13 that reduces nitrogen oxide in flue gas discharged from the boiler, and that sprays hydrogen chloride into the gas to oxidize and reduce mercury; the air heater 14 that recovers heat in gas from which the nitrogen oxide has been reduced; the dust extractor 15 that reduces dust in gas from which the heat has been recovered; the desulfurization apparatus 16 that reduces sulfur oxide in gas from which the dust has been reduced; the stack 17 from which desulfurized gas is discharged to the outside; the carry-in tank truck 22A that carries in the feedstock, i.e., concentrated hydrochloric acid (35% hydrochloric acid) 21; the hydrogen chloride vaporizer 24 that vaporizes the concentrated hydrochloric acid (35% hydrochloric acid) to obtain the hydrogen chloride 23; the liquid level regulator 27 that separates the residual hydrogen chloride 26 from the extracted dilute hydrochloric acid 25A discharged as a by-product from the hydrogen chloride vaporizer 24, and that regulates the liquid level of the hydrogen chloride vaporizer 24; the concentration regulating tank 28 that regulates the hydrochloric acid concentration of the extracted dilute hydrochloric acid 25B from which the residual hydrogen chloride 26 has been separated; the by-product tank 30 that stores therein the dilute hydrochloric acid 29 regulated to have a predetermined concentration; and the carry-out tank truck 22B that carries out the dilute hydrochloric acid 29 with a regulated predetermined concentration discharged from the by-product tank 30.

Information including the amounts of a feedstock to be supplied to and used in these devices, the production amount of a by-product, the production amount of hydrogen chloride, and the mercury amount is obtained, and each piece of information is computed in an arithmetic unit (central processing unit (CPU)). Further, feedstock feed sections and a hydrogen chloride production section are coupled via a network (not shown).

Each of the feedstock feed sections. Each feedstock feed section includes: an inventory management section that determines the used amount of hydrochloric acid according to a fuel type, orders a feedstock, and manages an inventory; and a distribution section that determines a purchase amount of a feedstock, predicts a production amount of a by-product, and sells a produced by-product.

The hydrochloric acid production section includes a production management terminal that notifies the amount of produced hydrogen chloride to the air pollution control system. The inventory management section includes an inventory management terminal that notifies data on an inventory amount of a stored feedstock to a feedstock supply section.

The distribution section includes a management terminal that monitors the used amount of a feedstock, and a management terminal that monitors the production amount of a produced by-product.

Figure 6:
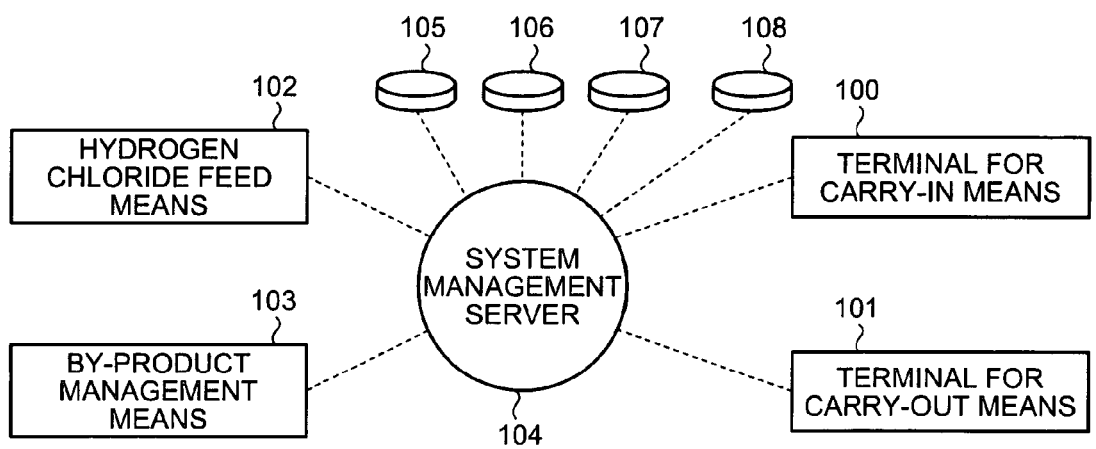
FIG. 6 is a conceptual diagram of elements of a feed system.

FIG. 6 is a conceptual diagram of elements of a feed system. The feed system includes a terminal for carry-in means 100, a terminal for carry-out means 101, hydrogen chloride feed means 102; and by-product management means 103. These elements are networked via a system management server 104.

Each of the terminals includes a central processing unit (CPU), a work memory, and a communication control interface for transmission to and reception from the system management server 104. The terminal for carry-in means 100 stores therein programs for extracting information necessary for buying a feedstock from order entry information received via the system management server 104, checking the inventory, and instructing purchase.

The terminal for carry-out means 101 stores therein: programs for computing an amount of sales to each sale destination, i.e., customer, based on the information of the production amount sent from the by-product management means 103; and forms for sending auction information to a sale destination, i.e., customer.

The system management server 104 includes a feedstock inventory database 105 that stores therein data on the inventory amount of a feedstock, which is sent from the inventory amount management terminal. The system management server 104 also includes: a by-product database 106 that stores therein data on the concentration and the amount of a produced by-product; a customer information database 107 that accumulates information on a customer having bought a feedstock, and delivery history for each customer; and a by-product cost database 108 to which the price of a by-product per unit weight is recorded.

The hydrogen chloride feed means 102 includes a terminal for computing a production amount of the hydrogen chloride 23 based on a feedstock, displaying it as analysis information, and sending it to the system management server 104.

The by-product management means 103 includes: a concentration regulating tank that measures a concentration of a by-product from which hydrogen chloride has been produced, and regulates the concentration depending on its concentration value; and the by-product tank 30 that stores therein a non-regulated by-product having a predetermined concentration. The by-product management means 103 further includes a terminal for feeding to the by-product tank 30 a by-product with a concentration regulated depending on its concentration value, displaying it as by-product information, and sending it to the system management server 104.

On the other hand, an air pollution control section measures the used amount of hydrogen chloride when treating flue gas discharged from the boiler, and monitors whether the amount of mercury in the flue gas is equal to or less than a predetermined amount. The used amount of hydrogen chloride, and the mercury concentration in the flue gas are constantly recorded by a management server at the air pollution control section.

The following describes a process flow of air pollution control performed by the air pollution control system 10. Considering the operation plan of the boiler, prediction is made for an amount of a feedstock to be used in a predetermined number of days. Then, a management server at the production section sends an order for the feedstock (35% hydrochloric acid) including predetermined order information via an electronic mail or the like. This order information includes the amount of the feedstock (35% hydrochloric acid), a desired delivery date, and a delivery location.

Upon receiving the order, a hydrochloride acid supplier delivers the concentrated hydrochloric acid by the carry-in tank truck 22A, based on the order information. The terminal for carry-in means 100 checks the information delivered by the carry-in tank truck 22A. The information is stored in the system management server 104 and then registered.

In the air pollution control, a predetermined amount of the hydrogen chloride 23 is produced from a feedstock at the hydrogen chloride vaporizer 24, and a by-product is extracted at the liquid level regulator 27. If the extracted by-product has a high concentration (e.g., 22% or more), the by-product is sent to the concentration regulating tank 28, regulated with the water 40 to have a predetermined concentration (22%), and then stored in the by-product tank 30. The amount of the stored by-product is accumulated and recorded in the system management server 104.

A carry-in tank truck 22A with the empty tank is moved, and the dilute hydrochloric acid (22%) discharged from the by-product tank 30 is loaded thereon. Accordingly, by a carry-out tank truck 22B with the dilute hydrochloric acid fully loaded, the dilute hydrochloric acid (22%) is delivered to a hydrochloric acid supplier.

For this delivery, a sale destination is predetermined by auction. Purchase information of the auction is sent to the system management server 104, and recorded to the customer information database 107.

After the above processes, an invoice is created using a predetermined invoice format based on the information stored in the customer information database 107, via the system management server 104.

As such, the processes are carried out that include carrying in a feedstock and shipping, for reutilization, a by-product produced according to the usage of the hydrogen chloride. The processes vary depending on the coal type etc. Because the used amount of hydrogen chloride in the air pollution control system largely varies depending on the amount of chlorine contained in coal, the used amount of hydrogen chloride is predicted based on the database of coal used as a fuel. Accordingly, the variation in production amount of a by-product can be predicted. Because the production amount of a by-product increases as the used amount increases, auction is used to sell the by-product immediately. In this way, unnecessary stock of the by-product is reduced from the facility.

The following describes an example of selling dilute hydrochloric acid by auction on the Internet.

(Step 0) A plan for supplying hydrochloric acid is developed based on a plan for supplying coal to be used in a power station, as specified in the following Steps 1 to 3.

(Step 1) A hydrogen chloride concentration in flue gas resulting from coal combustion is extracted from property data of coal types.

(Step 2) Based on the hydrogen chloride concentration necessary for a denitration catalyst (e.g., hydrogen chloride concentration of 300 ppm), an amount of hydrogen chloride to be added is calculated. The concentration of the addition is changed appropriately depending on the operating performance.

(Step 3) From the amount of hydrogen chloride calculated at Step 2, an amount (a) of concentrated hydrochloric acid (35%) to be supplied is calculated. In this case, about half the amount of hydrogen chloride contained in the concentrated hydrochloric acid to be supplied is discharged as dilute hydrochloric acid (22%). An amount (b) of hydrochloric acid (22%) to be discharged is calculated.

(Step 4) Based on the amount (a) of the 35% concentrated hydrochloric acid to be supplied and the amount (b) of the 22% dilute hydrochloric acid to be discharged, a reverse auction is carried out using a set of a purchase price of the 35% concentrated hydrochloric acid, a buying price of the 22% hydrochloric acid, and a fee for carrying in and out such hydrochloric acid.

For the reverse auction, for example, a bidding system on the Internet is employed.

As a rough idea for the prices, for example, the purchase price of the 35% hydrochloric acid is set lower than its market price. On the contrary, the sale price of the 22% hydrochloric acid is set higher than its market price. This is because the 22% dilute hydrochloric acid needs to be sold out constantly without being stored within the power station.

This enables appropriate trade constantly. Further, the extracted dilute hydrochloric acid can be regulated with supplied water to dilute hydrochloric acid with a predetermined concentration, ranging from 20% to 30%. This enables shipping of hydrochloric acid with a concentration desired by a customer.

According to the present invention, dilute hydrochloric acid discharged as a waste product is returned to a supplier as a valuable product with a predetermined concentration.

Receiving dilute hydrochloric acid with a predetermined concentration, a hydrochloric acid supplier can treat it to concentrated hydrochloric acid by injecting hydrogen chloride as required, so as to reutilize it.

The dilute hydrochloric acid with a predetermined concentration can be used for a cleaning agent, a wastewater neutralizer, a scale remover, and other applications, without being treated.

Further, the by-product, i.e., dilute hydrochloric acid with a regulated concentration (e.g., 22% hydrochloric acid), can be loaded in and transported by a tank used for transporting a feedstock, i.e., concentrated hydrochloric acid (e.g., 35% hydrochloric acid). This improves transport efficiency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air pollution control system comprising:
  a spray device that sprays hydrogen chloride into flue gas discharged from a coal combustion boiler;
  a denitration apparatus that reduces nitrogen oxide in flue gas into which the hydrogen chloride has been sprayed, and that oxidizes mercury;
  an air heater that recovers heat in gas from which the nitrogen oxide has been reduced;
  a dust extractor that reduces dust in gas from which the heat has been recovered;
  a desulfurization apparatus that reduces sulfur oxide in gas from which the dust has been reduced;
  a stack from which gas thus desulfurized is discharged outside;
  carry-in means that carries in concentrated hydrochloric acid as a feedstock;
  a hydrogen chloride vaporizer that vaporizes the concentrated hydrochloric acid to obtain hydrogen chloride;
  a liquid level regulator that separates residual hydrogen chloride from extracted dilute hydrochloric acid discharged from the hydrogen chloride vaporizer, and that regulates a liquid level of the hydrogen chloride vaporizer;
  a gas-liquid separator that separates the residual hydrogen chloride from extracted dilute hydrochloric acid;
  a concentration regulating tank that regulates a hydrochloric acid concentration of extracted dilute hydrochloric acid from which the residual hydrogen chloride has been reduced;
  a by-product tank that stores therein dilute hydrochloric acid regulated to have a predetermined concentration; and
  carry-out means that carries out the dilute hydrochloric acid with a predetermined concentration discharged from the by-product tank.

* * * * *